Oct. 1, 1957 L. F. HEMPHILL 2,807,844
APPARATUS FOR MAKING DYNAMOELECTRIC MACHINE CAST WINDING ROTOR
Filed May 28, 1953
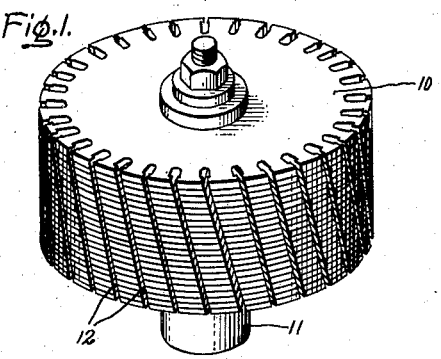
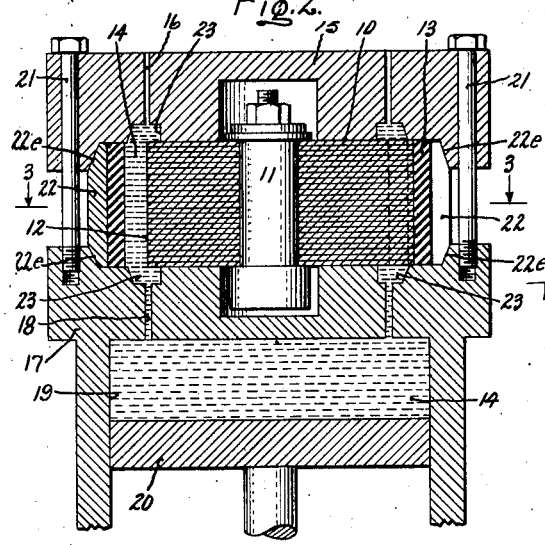
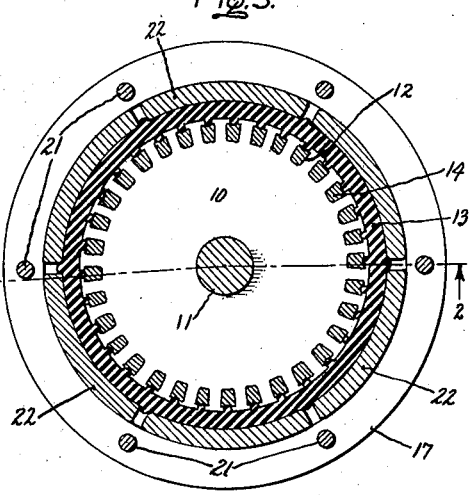
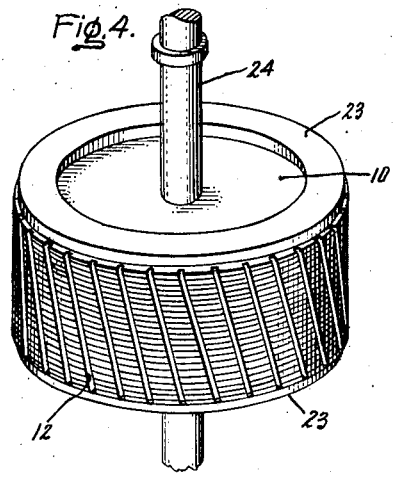
Inventor:
Lawrence F. Hemphill,
by *Robert G. Irus*
His Attorney.

United States Patent Office 2,807,844
Patented Oct. 1, 1957

2,807,844

APPARATUS FOR MAKING DYNAMOELECTRIC MACHINE CAST WINDING ROTOR

Lawrence F. Hemphill, San Jose, Calif., assignor to General Electric Company, a corporation of New York Application May 28, 1953, Serial No. 358,137

2 Claims. (Cl. 22—116)

My invention relates to improved methods and apparatus for making dynamoelectric machine members having cast windings therein, and has particular significance in connection with the manufacture of squirrel cage type induction motor rotors.

In the manufacture of dynamoelectric machines which are provided with cast windings, such as squirrel cage windings for induction motor rotors, the rotor core members are generally made of laminations of magnetic material provided with axially extending winding slots which contain the cast winding bars. There has heretofore been a problem in connection with terminating the cast material at or near the periphery of the core laminations. It has been known in the past to allow the cast material to extend to or beyond the peripheral extent of the annular core material laminations and then remove the excess cast material by grinding or machining down both laminations and cast winding material to a true periphery but this has led to smearing of the cast material around and between the laminations causing short-circuiting therebetween and increased eddy current and other losses during operation of the completed machine.

Furthermore, it is desirable to terminate the radial extent of the cast material of the rotor bars at a point radially inwardly from the finally machined outer surface of the rotor core in order to reduce eddy current losses in the cast rotor bars. It is believed that during the operation of the motor, flux of high frequency crosses the air gap from a stator tooth to a rotor tooth then crosses a winding slot to the next adjacent rotor tooth before re-crossing the air gap to the stator tooth adjacent the first stator tooth. Evidence indicates that the flux passing through that portion of the cast material of the rotor bars substantially in the plane of the surface of the rotor core results in eddy current losses that would not occur if the outer extent of the cast material of the rotor bars were limited to a point radially inwardly from the surface of the rotor core.

An object of the present invention is to provide simple and inexpensive means for overcoming the above-mentioned difficulties.

A further object of the present invention is to provide an improved method of making a dynamoelectric machine cast winding rotor.

A still further object of the present invention is to provide improved apparatus useful in the making of dynamoelectric machine cast winding rotors.

In accordance with one aspect of the present invention, I accomplish these and other objects by providing, for a rotor core member having winding slots and made up of annular laminations of magnetic material, a mold jacket of a heat resistant, readily deformable flexible material such as silicone rubber. Means are provided for exerting an external pressure on the flexible material to cause it to occupy the winding slots a little inward from the core periphery, and since the material is able to withstand the high heat of molding when a conductive material, such as aluminum, is then cast into the winding slots which are no longer open to the periphery of the core, a method is thus provided to prevent smearing of cast material around the core periphery during a subsequent machining operation. In addition, a simple method is provided for making an induction rotor having cast windings terminating radially inwardly from the rotor periphery.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

Fig. 1 is a perspective view of an assembled laminated core provided with winding slots before the winding has been cast therein, and which may be used in carrying out the present invention;

Fig. 2 is a side elevation in section showing the dynamoelectric machine cast winding rotor assembly during one step of its construction and along the line 2—2 of Fig. 3 and within a mold which in accordance with the invention comprises a flexible jacket 13 interposed between metallic mold parts and the rotor core and winding material;

Fig. 3 is a sectional plan view of the line 3—3 of Fig. 2; and

Fig. 4 is a perspective view illustrating a completed dynamoelectric machine rotor with a squirrel cage winding cast therein in accordance with the method and apparatus of the present invention.

Referring to the drawing, I have illustrated my invention in connection with a cast squirrel cage induction motor rotor which, as shown in Fig. 1, is provided with a core 10 formed of a plurality of annular laminations of magnetic material which are shown temporarily assembled on an arbor 11 for the step of the casting of a winding in substantially axially extending winding slots 12 formed adjacent the periphery of the core. In order to improve the efficiency of the machine by minimizing electrical contact between the squirrel cage winding and the core 10, it is desirable that the cast winding should be insulated from the core 10. Inward of the core periphery, it is conventional to so insulate winding and core either by depending upon the oxidation of either or both of these members, or by using insulating varnish or a clay wash deposit on the sides of the winding slots before the casting is undertaken. These conventional practices have proved adequate and any one of them may be used in connection with the present invention which is directed, rather, to separating the core and winding at the core periphery.

Generally, it has been found that the peripheries of the individual laminations or punchings cannot be accurately aligned one with the other upon an arbor, mandrel or shaft, and, therefore, the laminations are initially made larger than the desired finish diameter and, generally after the casting operation, the member is finished by turning, and in some instances by grinding, to the desired dimension. In accordance with one aspect of the present invention, in order to prevent this finishing operation from smearing some of the cast metal of the winding into intimate electrical contact with the newly machined edge of the laminated core thereby to effectively short circuit the various laminations of the core and to produce undesirable core losses under normal running conditions, I provide a heat-resistant deformable molding jacket 13 which, as illustrated in Fig. 2, enters part way into each of the winding slots 12 to maintain the outer diameter of the subsequently cast winding material 14 less than the finished outer diameter of the core 10. The heat-resistant readily deformable material of jacket 13 may comprise any one of several materials. Among such materials which are satisfactory for the present application are, for example, a silicone rubber, matted asbestos with silicone sticker, or a glass mat. All of these materials have heat-resistant properties which will stand up under the high heat which is necessary to cause flow of the molten metal to be cast in the winding slots, and which molten metal may be aluminum, magnesium or other non-ferrous metal having a conductivity suitable for such a squirrel cage rotor winding.

The top and bottom portions of the mold are somewhat conventional and include a mold top portion 15 having relief wells 16, the presence of metal in which indicate that the casting process is complete. The mold base portion 17 has sprue gates 18 connecting with a reservoir portion 19 containing a pressure piston 20. Means are provided for holding top and bottom mold portions together and upon the core, and in the illustrated embodiment such means comprise bolts 21 engaging threads tapped into the base 17.

As shown in the drawing, the deformable material of jacket 13 must, to some extent, enter into (and during casting stay in) the winding slots 12, and to this end an external pressure is exerted upon the jacket material with this pressure of sufficient degree to balance against the casting pressure exerted by piston 20. In accordance with the illustrated embodiment of the invention this external pressure is exerted by arcuate metallic segments 22, such as steel, which encircle the jacket and are biased radially inward thereagainst by wedge-shaped ends 22e mating with correspondingly wedge-shaped surfaces in the top mold portion 15 and in the bottom mold portion 17 as these mold portions are drawn together by bolts 21.

When the mold parts including the jacket are all assembled upon the core as above described, the non-ferrous metal 14 is cast in the open spaces provided, being introduced, for example, by pressure through sprue gates 18 from the reservoir 19 under pressure created by the piston 20 to form conductor bars in the winding slots together with end rings 23.

It readily lies within the province of the designer to so select dimensions and materials such that jacket 13 is sufficiently compressed between segments 22 and the core 10 that it will extend a slight distance into each of the winding slots 12 as most clearly shown in Fig. 3 and stay there during casting. Thus, the cast material 14 will not extend beyond or even to peripheral boundary of the core 10 so that some grinding or turning of the core can be done without any fear of smearing of the conductor material. The distance that jacket 13 extends into winding slots 12 may, if desired, be determined so that the cast material 14 will not extend to the machined periphery of the finished core 10.

When the casting step is complete, the core is removed from the mold, the jacket is removed from the core, sprue gates 18 are broken or machined off and the cast end rings otherwise finished to desired proportions. Before or after any machining or grinding of the core periphery which will, of course, need to be to a lesser depth than the outer radial extent of the cast winding bars in the slots, the arbor 11 may be replaced by a dynamoelectric machine shaft 24 to provide the finished rotor as seen in Fig. 4.

There is thus provided an apparatus and method of the type described capable of meeting the objects above set forth. The finished rotor has all of the recognized desirable characteristics of an open slot rotor while at the same time the deformable jacket material will have prevented the cast winding material from flowing out of the openings in the slots because the jacket material was forced by pressure in the spaces between the core teeth. This effectively eliminates the prior art problems created by establishing short circuits between laminations by smearing of cast winding material over bare lamination surfaces during the peripheral finishing operation.

Also by utilizing this invention, high frequency eddy current losses may be reduced by providing a cast squirrel cage induction rotor in which the cast rotor bars do not extend outwardly to the finally machined surface of the rotor core.

While I have illustrated and described a particular embodiment of my invention, various modifications will obviously occur to those skilled in the art. I desire it to be understood, therefore, that my invention is not to be limited to the particular arrangement disclosed and I intend in the appended claims to cover all modifications which do not depart from the true spirit and scope of my invention.

What I claim as new and desire to secure by Letters Patent of the United States is:

1. Apparatus for casting a winding in squirrel cage type slots of a dynamoelectric machine rotor core and comprising a mold top part positioned at one end of the rotor core, a mold bottom part positioned at the other end of the rotor core, a plurality of arcuate segments designed to fit between said parts and about the core to define an annular space therewith, a silicone rubber mold jacket occupying said space and adapted to enter partially into the slots of the core, and means to exert an external pressure upon said mold jacket.

2. Apparatus for casting a winding in a dynamoelectric machine rotor core having conductor receiving slots in the periphery thereof for casting a metal therein, comprising a molding jacket formed of a heat-resistant readily deformable material surrounding said core, a mold including a segmented backing ring having beveled surfaces at the ends thereof and means providing beveled surfaces to cooperate with the beveled surfaces on said backing ring to move said segments toward said core to compress said jacket and to cause the same to enter the peripheral portion of said slots.

References Cited in the file of this patent

UNITED STATES PATENTS

| | | |
|---|---|---|
| 1,360,484 | Wiard | Nov. 30, 1920 |
| 1,935,747 | Ratta | Nov. 21, 1933 |
| 2,065,213 | Dolan et al. | Dec. 22, 1936 |
| 2,239,989 | Britton | Apr. 29, 1941 |
| 2,321,731 | Bouton et al. | June 15, 1943 |
| 2,466,432 | Jenkins | Apr. 5, 1949 |

FOREIGN PATENTS

| | | |
|---|---|---|
| 489,999 | Great Britain | Aug. 8, 1938 |